(12) United States Patent
Goel

(10) Patent No.: US 11,606,694 B2
(45) Date of Patent: Mar. 14, 2023

(54) SYSTEM THAT PROVIDES CYBERSECURITY IN A HOME OR OFFICE BY INTERACTING WITH INTERNET OF THINGS DEVICES AND OTHER DEVICES

(71) Applicant: Surendra Goel, Mclean, VA (US)

(72) Inventor: Surendra Goel, Mclean, VA (US)

( * ) Notice: Subject to any disclaimer, the term of this patent is extended or adjusted under 35 U.S.C. 154(b) by 238 days.

(21) Appl. No.: 17/066,107

(22) Filed: Oct. 8, 2020

(65) Prior Publication Data
US 2022/0116783 A1    Apr. 14, 2022

(51) Int. Cl.
| | |
|---|---|
| *H04W 64/00* | (2009.01) |
| *H04W 4/70* | (2018.01) |
| *H04W 12/63* | (2021.01) |
| *H04W 12/122* | (2021.01) |
| *H04W 12/08* | (2021.01) |

(52) U.S. Cl.
CPC .......... *H04W 12/122* (2021.01); *H04W 4/70* (2018.02); *H04W 12/08* (2013.01); *H04W 12/63* (2021.01); *H04W 64/00* (2013.01)

(58) Field of Classification Search
CPC ..... H04W 12/122; H04W 4/70; H04W 12/08; H04W 12/63; H04W 64/00; H04W 12/71; H04L 63/101; H04L 63/1433
See application file for complete search history.

(56) References Cited

U.S. PATENT DOCUMENTS

| | | |
|---|---|---|
| 8,099,787 B2 | 1/2012 | Vasudeva |
| 8,335,842 B2 * | 12/2012 | Raji ....................... G06Q 50/12 709/224 |
| 8,977,588 B1 | 3/2015 | Engler et al. |
| 8,984,633 B2 | 3/2015 | Reutter |
| 9,208,335 B2 | 12/2015 | Wu et al. |
| 9,396,319 B2 | 7/2016 | Shuart et al. |
| 9,426,614 B2 | 8/2016 | Shankaranarayanan et al. |
| 9,532,227 B2 | 12/2016 | Richards et al. |
| 9,578,033 B2 | 2/2017 | Matthieu et al. |

(Continued)

FOREIGN PATENT DOCUMENTS

| | | |
|---|---|---|
| CN | 1183841 A | 6/1998 |
| EP | 3665576 A1 | 6/2020 |

(Continued)

*Primary Examiner* — Mohammed Waliullah
(74) *Attorney, Agent, or Firm* — Karthik Murthy; Murthy IP Inc.

(57) ABSTRACT

The invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; and wherein the monitoring device keeps a registry of an electronic signature from each of the devices the monitoring device has approved to be on the wireless network.

9 Claims, 8 Drawing Sheets

(56) References Cited

U.S. PATENT DOCUMENTS

| | | |
|---|---|---|
| 9,591,022 B2 | 3/2017 | Purpura |
| 9,596,603 B2 | 3/2017 | Spencer et al. |
| 9,609,011 B2 | 3/2017 | Muddu et al. |
| 9,824,609 B2 | 11/2017 | Sadeh-Koniecpol et al. |
| 9,906,542 B2 | 2/2018 | Boia et al. |
| 9,985,846 B1 | 5/2018 | Roman et al. |
| 10,015,675 B2 | 7/2018 | Richards et al. |
| 10,110,622 B2 | 10/2018 | Boia et al. |
| 10,417,432 B2 | 9/2019 | Mahaffey et al. |
| 10,440,028 B1 | 10/2019 | Makmel et al. |
| 10,469,480 B2 | 11/2019 | Kumar et al. |
| 10,505,920 B2 | 12/2019 | Kumar et al. |
| 10,642,715 B1 | 5/2020 | Simca et al. |
| 10,657,261 B2 | 5/2020 | Kumar et al. |
| 10,698,986 B2 | 6/2020 | Choi et al. |
| 10,699,008 B2 | 6/2020 | Agarwal |
| 10,700,976 B2 | 6/2020 | Richards et al. |
| 2001/0032335 A1 | 10/2001 | Jones |
| 2007/0128899 A1 | 6/2007 | Mayer |
| 2011/0219451 A1 | 9/2011 | McDougal et al. |
| 2013/0325873 A1 | 12/2013 | Sitsky et al. |
| 2014/0199663 A1 | 7/2014 | Sadeh-Koniecpol et al. |
| 2014/0199664 A1 | 7/2014 | Sadeh-Koniecpol et al. |
| 2015/0095441 A1 | 4/2015 | Barrera et al. |
| 2015/0188949 A1 | 7/2015 | Mahaffey et al. |
| 2015/0264564 A1* | 9/2015 | Vanderhulst .......... H04W 4/023 726/3 |
| 2015/0295948 A1 | 10/2015 | Hassell et al. |
| 2016/0042287 A1 | 2/2016 | Eldardiry et al. |
| 2016/0171479 A1* | 6/2016 | Prakash ............. H04L 63/0876 726/1 |
| 2016/0277439 A1 | 9/2016 | Rotter et al. |
| 2017/0034700 A1 | 2/2017 | Cohen et al. |
| 2017/0103204 A1 | 4/2017 | Mitola, III |
| 2017/0126728 A1 | 5/2017 | Beam et al. |
| 2017/0169208 A1 | 6/2017 | Jantz et al. |
| 2017/0169230 A1 | 6/2017 | Zheng et al. |
| 2017/0180394 A1 | 6/2017 | Crofton et al. |
| 2017/0244746 A1 | 8/2017 | Hawthorn et al. |
| 2017/0255915 A1* | 9/2017 | Chandrasekaran ......................... G06Q 20/3224 |
| 2017/0262923 A1 | 9/2017 | Bute et al. |
| 2017/0270295 A1 | 9/2017 | Park et al. |
| 2017/0329942 A1 | 11/2017 | Choi |
| 2017/0331840 A1* | 11/2017 | Ranjan ................ H04L 63/1416 |
| 2018/0025180 A1 | 1/2018 | Wang et al. |
| 2018/0026995 A1 | 1/2018 | Dufour et al. |
| 2018/0097821 A1 | 4/2018 | Benitez |
| 2018/0139219 A1 | 5/2018 | Sabata et al. |
| 2018/0159876 A1 | 6/2018 | Park et al. |
| 2018/0241727 A1 | 8/2018 | Verzun et al. |
| 2018/0249325 A1 | 8/2018 | Roman et al. |
| 2018/0259638 A1* | 9/2018 | Campbell ............. A61B 5/1113 |
| 2018/0262388 A1 | 9/2018 | Johnson et al. |
| 2018/0293389 A1* | 10/2018 | Mahaffey ............ H04L 63/0227 |
| 2018/0336355 A1 | 11/2018 | Agarwal |
| 2018/0337939 A1 | 11/2018 | Agarwal |
| 2018/0343238 A1 | 11/2018 | Tola |
| 2018/0359272 A1 | 12/2018 | Mizrachi et al. |
| 2018/0359811 A1 | 12/2018 | Verzun et al. |
| 2019/0005237 A1 | 1/2019 | Long et al. |
| 2019/0042870 A1 | 2/2019 | Chen et al. |
| 2019/0098039 A1 | 3/2019 | Gates et al. |
| 2019/0123978 A1 | 4/2019 | Shaw et al. |
| 2019/0147161 A1 | 5/2019 | Agarwal |
| 2019/0220583 A1 | 7/2019 | Douglas et al. |
| 2019/0228161 A1 | 7/2019 | Grindstaff, II et al. |
| 2019/0253431 A1 | 8/2019 | Atanda |
| 2019/0258801 A1 | 8/2019 | Mitola, III |
| 2019/0319987 A1 | 10/2019 | Levy et al. |
| 2019/0324836 A1 | 10/2019 | Fleischman et al. |
| 2019/0325135 A1 | 10/2019 | David et al. |
| 2019/0340379 A1 | 11/2019 | Beecham |
| 2019/0370477 A1* | 12/2019 | Agarwal ............... G06F 21/577 |
| 2019/0372938 A1 | 12/2019 | Pasdar |
| 2019/0386969 A1 | 12/2019 | Verzun et al. |
| 2019/0394195 A1 | 12/2019 | Chari et al. |
| 2020/0021620 A1 | 1/2020 | Puratheppparambil et al. |
| 2020/0043497 A1* | 2/2020 | Hahm ................... H04W 4/029 |
| 2020/0057851 A1 | 2/2020 | Agarwal |
| 2020/0076831 A1 | 3/2020 | Baughman et al. |
| 2020/0153250 A1 | 5/2020 | Price |
| 2020/0162890 A1* | 5/2020 | Spencer ................ H04L 63/105 |
| 2020/0177636 A1 | 6/2020 | Linn et al. |
| 2020/0201962 A1 | 6/2020 | Brannon et al. |
| 2020/0202271 A1 | 6/2020 | Brannon et al. |
| 2020/0204463 A1 | 6/2020 | Guan et al. |
| 2020/0213857 A1 | 7/2020 | Obaidi |
| 2020/0274877 A1* | 8/2020 | Kwatra ................... H04L 43/04 |
| 2020/0312466 A1* | 10/2020 | Banerjee ................ G16H 30/20 |
| 2020/0344602 A1* | 10/2020 | Li ........................ H04L 67/125 |
| 2021/0273951 A1* | 9/2021 | Wang .................... G06N 20/00 |
| 2022/0191240 A1* | 6/2022 | Wolosewicz ........... G06N 5/022 |

FOREIGN PATENT DOCUMENTS

| | | |
|---|---|---|
| GB | 2479131 A | 10/2011 |
| JP | 2015508540 A | 3/2015 |
| KR | 20190100177 A | 8/2019 |
| WO | 2008072093 A2 | 6/2008 |
| WO | 2016191369 A1 | 12/2016 |
| WO | 2017127850 | 7/2017 |
| WO | 2019121136 A1 | 6/2019 |
| WO | 2019123447 A1 | 6/2019 |
| WO | 2020093020 A1 | 5/2020 |

* cited by examiner

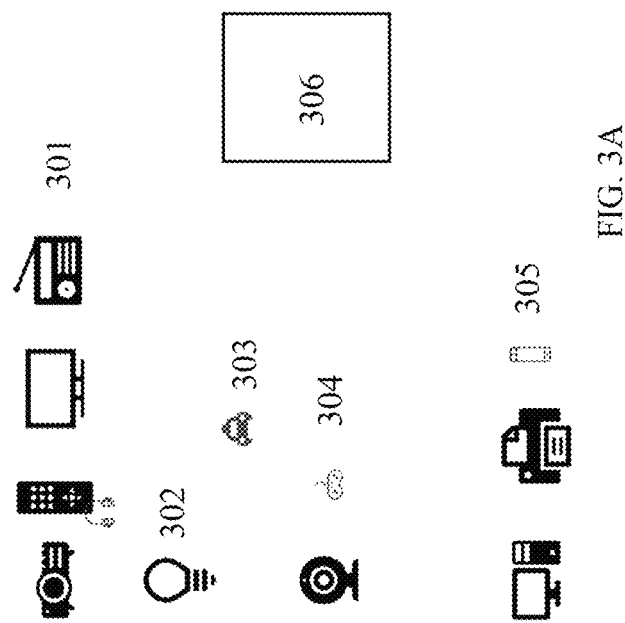

- Create vulnerability profile for a group or device type, functions and other attributes of the device
  - Entertainment
  - Computing
  - Door Lock, Garage Door
  - Thermostat,
  - Door Bell
  - Lighting

FIG. 4B

SYSTEM THAT PROVIDES CYBERSECURITY IN A HOME OR OFFICE BY INTERACTING WITH INTERNET OF THINGS DEVICES AND OTHER DEVICES

FIELD OF THE INVENTION

The present invention relates to the Internet of things and cybersecurity.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties Such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an and "the includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as') provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any Such inclusion or deletion occurs, the specification is herein deemed to contain the group as modified thus fulfilling the written description of all Markush groups used in the appended claims.

In regards to home cybersecurity, most homes are not protected, there is no firewall, there are sensors in different places. As you add Internet of things ("IOT") devices, you don't know who's intruding, or which devices may be rogue. Rogue devices are devices that have been captured by an outside entity, and are now malicious. Such rogue devices are likely trying to harm the user or steal information or data. Maybe the data is going to China or anywhere else in the world where it is not supposed to go. This could be harmful if the data includes personal identifying information that the malicious controllers of the rogue devices can use to cause financial harm to the user.

Another common error is that people often use the default password, which further lowers security because intruders may have that default password, and use it to gain access to a user's network.

In addition to IOT devices, there are also regular devices connected to the internet, such as computers, phones, routers and TVs. These devices are also often at risk in a cybersecurity sense. Often, people have no idea how many devices are connected to their network. They also might not know the location of the devices connected to their network.

SUMMARY

The present invention solves these issues, because the present invention is simple to configure and use, and checks for vulnerabilities. Furthermore, the present invention can analyze how many devices are connected to the network, where those devices are within a building or home or any enclosed space, and whether those devices are actually supposed to be connected to the network.

The present invention continues keeping track of devices on the network, and is aware of any new devices added to the network. The present invention can analyze whether that new device is actually supposed to be added to the network, and if not, can analyze vulnerabilities related to the intruding device.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 3A is a drawing of an example registry of signatures of the devices, produced by the present invention according to various embodiments of the present disclosure.

FIG. 4B is a drawing of a flowchart showing the process of creating a vulnerability profile for a group or device type, based on functions and other attributes of the device, produced by the present invention according to various embodiments of the present disclosure.

DETAILED DESCRIPTION

Figure 1:
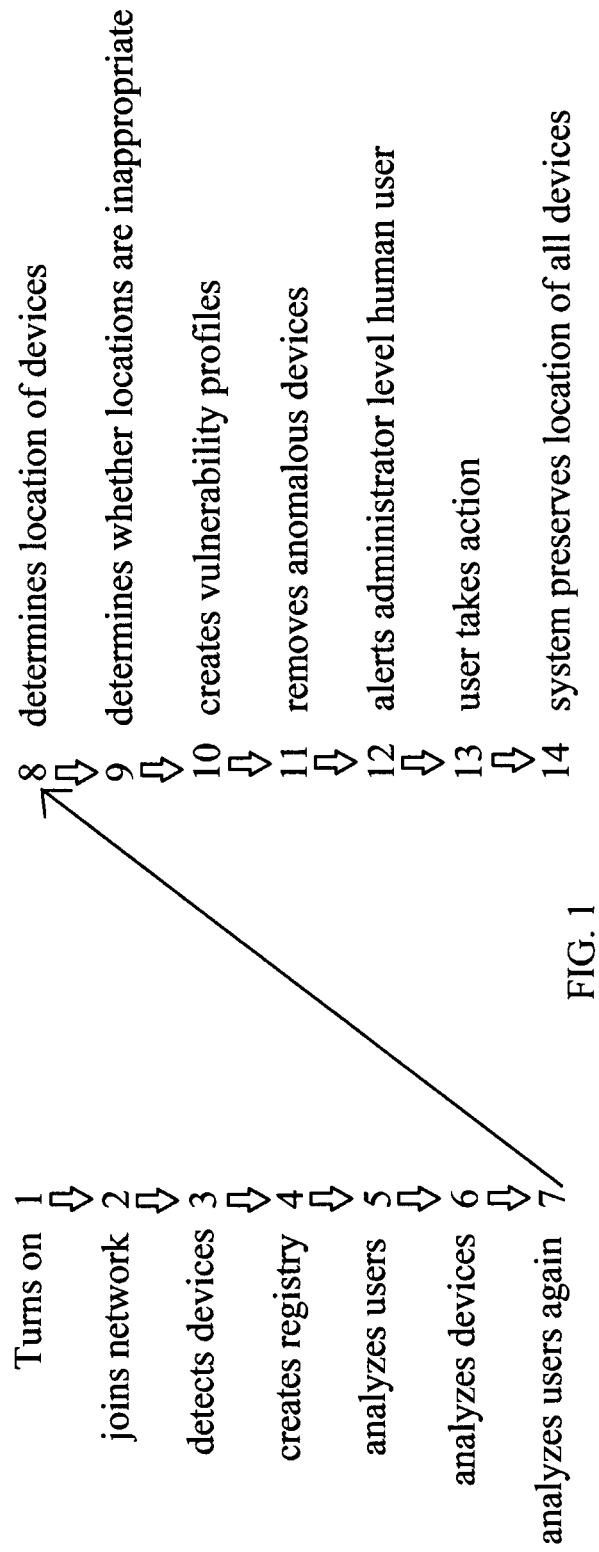
FIG. 1 is a drawing of a flow chart that shows how the present invention becomes aware of each connected device on the network, analyzes each device, and keeps track of that device according to various embodiments of the present disclosure.

Various embodiments of the present disclosure relate to providing a complete home cybersecurity protection system.

The system will manage multiple internet of things devices.

The system will manage where data collected by those internet of things devices is being sent.

The system will analyze and manage passwords.

The system will be easy to configure, and will automatically check for cybersecurity vulnerabilities.

The system will detect devices on the home network, categorize devices, and create a vulnerability model.

There will be different cybersecurity vulnerabilities for a light bulb vs thermostat or garage.

The system will autodetect connected devices. The system will look at electronic signatures.

The system will create a registry of signatures to identify each device. This could be helpful in the event that a hacker is trying to impersonate a device, perhaps by keeping the same name as the device, and trying to get onto the network. The registry would prevent such an act, because the registry would be aware of technical details and technical signatures so as to differentiate the known device from an unknown device. The system could then go ahead and block the unknown device.

As such, the system will alert you somewhere whenever a new device is added. This way you have the option of verifying yourself whether a new device is acceptable or not. The system could optionally require that any new device added to the network be verified by a human user of a certain level, such as administrator.

The system will create a security profile if something anomalous is in the network. This way if an unknown device joins the network, the system can attempt to analyze it and potentially create and implement a plan from blocking the device from accessing sensitive information. Alternatively, the system might be able to remove the unknown device from the network altogether, and perhaps utilizing the security profile, the system could prevent the unknown device from rejoining the network in the event that the unknown device attempts to rejoin the network.

The system will find the location of each device. The system will locate devices by measuring the direction of the signal connection between the device and the system. The system will also measure the time of the signal to reach the device and back. This will allow the system to calculate the distance in a certain direction where a device is located.

Through this process, the system will be able to keep track of the physical locations of the devices connected to the network. This may allow for realizations like that a neighbor is using a user's WIFI, or some other entity is actually physically located outside the house, but for some reason is using the house's network.

The system will act differently based on who is the user. For example, some users may be designated as administrator, and so may be allowed to make more changes than other users. Such changes might include changing passwords, turning on or off various functions of the system, or even having access to the results of the system. Alternatively, child users may be restricted from all of these activities, or perhaps from all activities altogether.

The system will detect who the users are. This may help the system realize that there is an unauthorized user who is trying to join the network, or is already on the network.

The system will create a digital footprint of a home for digital connections. This could entail a list of all devices that connect to the network, perhaps as well as a snapshot of the previous physical locations of all those devices. It might also include a snapshot of bandwidth consumed by each device. It could also include how much bandwidth each user is consuming, so as to know which user might be consuming far too much bandwidth.

In FIG. 1, one embodiment of the invention is displayed as a flowchart, showing the steps that the system takes to function. In step one, a user turns on the system 101. In step two, the system joins a wireless network 102. In step three, the system detects all devices connected to the wireless network 103. In step four, the system creates a registry of all devices connected to the wireless network 104. In step five, the system analyzes the users connected to the network 105. In step six, the system analyzes whether any devices should not be connected to the network 107. In step seven, the system analyzes whether any users should not be connected to the network. In step eight, the system determines the location of all the devices connected to the wireless network. In step nine, the system determines whether any of the locations of the devices connected to the wireless network are inappropriate, such as outside the house, or some other illogical location. In step ten, if the system determines a device has connected to the wireless network when that device is not supposed to be connected, then the system creates a vulnerability profile based on the potential threat from that device to the wireless network and the other devices on the wireless network. In step eleven, if necessary and capable, the system takes action to remove the anomalous device from the wireless network. In step twelve, the system might alert an administrator level human user about the anomalous device, either to inform the user that the anomalous device has been removed, or to ask the user to take some action to remove the anomalous device. In step thirteen, such action might include a user resetting the wireless network's password, or simply restarting the wireless network. In step fourteen, once the system determines that only the correct devices are connected to the wireless network, the system can take a snapshot of the location of the devices, and create a registry of unique signatures of the devices, so as to preserve them for use in the future in case a user wants to duplicate their setup of electronic devices in a new location.

Figure 2:
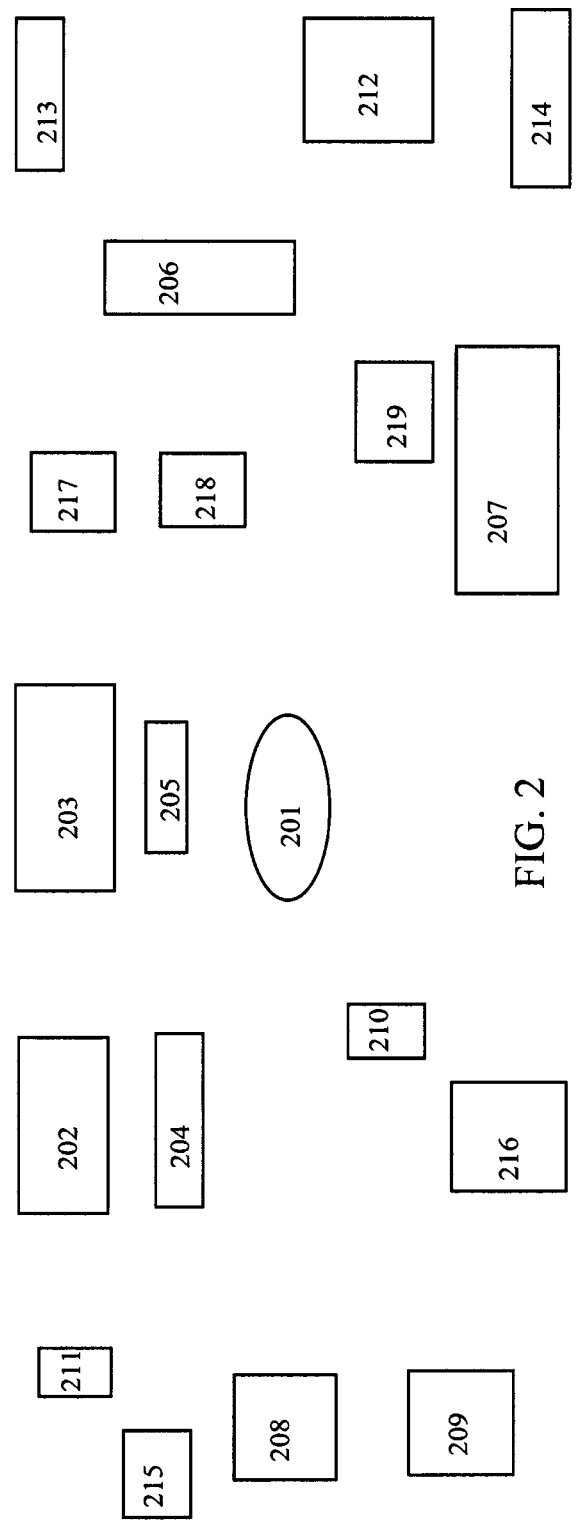
FIG. 2 is a drawing of an example of several devices connected to a network, showing how they connect and interact with each other, and with the present invention according to various embodiments of the present disclosure.

In FIG. 2, one embodiment of the invention is displayed as a snapshot of the locations of the devices connected to a wireless network 201, including a smart tv 202, a smart tv 203, a video game device 204, a video game device 205, a cable modem 206, a desktop computer 207, a laptop computer 208, a laptop computer 209, a smartphone 210, a smartphone 211, an alarm system 212, an alarm video camera 213, an alarm video camera 214, an IOT doorbell 215, an IOT virtual assistant microphone and speakers 216, a tablet computer 217, a tablet computer 218, and a printer 219.

In FIG. 3A, an example registry of devices is shown. Such a registry might be created by the system in order to keep track of the unique signature of each device correctly connected to the wireless network.

One way to create a unique signature is through cryptography, such as elliptic curve cryptography or public key cryptography, in order to generate part of the unique signature. For example, group 301 displays a projector, a remote control with headphones, a tv, and a radio player. So the unique signature for the projector might be projector1—[uniquely generated key], the unique signature for the remote control might be remotecontrol1—[uniquely generated key], the unique signature for the headphones might be headphones1—[uniquely generated key], the unique signature for the tv might be tv1—[uniquely generated key], and the unique signature for the radio player might be radioplayer1—[uniquely generated key].

Furthermore, the unique signature for the light bulb might be lightbulb1—[uniquely generated key], and the unique signature for the car 303 might be car1—[uniquely generated key]. Group 304 includes a webcam and a video game controller, so the unique signature for the webcam might be webcam1—[uniquely generated key], and the unique signature for the video game controller might be gamecontroller1—[uniquely generated key]. Group 305 includes a computer, a printer and a cell phone. The unique signature for the computer might be computer1—[uniquely generated key], the unique signature for the printer might be printer1—[uniquely generated key], and the unique signature for the cell phone might be cellphone1—[uniquely generated key].

These signature can be changed depending on the user's preference, and a different numerical suffix can be attached based on the number of similar devices, so if there were 2 computers the second computer's signature might be computer2—[uniquely generated key]. Also, different methods can be used to generate keys, not necessarily highly complex cryptographical methods but also more simple methods.

Wireless network 306 is what all these devices are connected to, and is what a user wants to keep secure, so any new additions to the wireless network 306 will be analyzed, provided a digital signature, and be scrutinized and possibly authenticated by both software the user themselves if necessary. Such a need might arise if the system determines the new device is somehow malicious or not normal in some way.

Figure 3B:
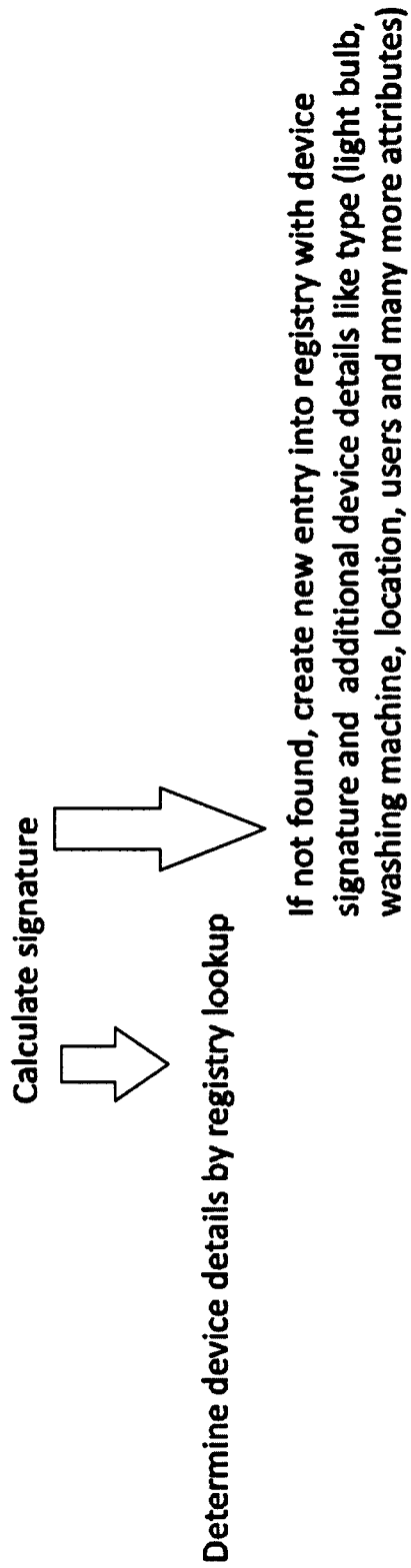
FIG. 3B is a drawing of a flowchart showing the process of calculating a signature, determining device details by registry lookup, and if the device details are not found in the registry lookup, then creating a new entry into the registry utilizing the device signature and additional device details like the type of device, produced by the present invention according to various embodiments of the present disclosure.

FIG. 3B displays a flowchart showing the process of calculating a signature, determining device details by registry lookup, and if the device details are not found in the registry lookup, then creating a new entry into the registry utilizing the device signature and additional device details like the type of device. Some examples of the types of devices are: light bulb, washing machine, location, users, and many more attributes.

Figure 4A:
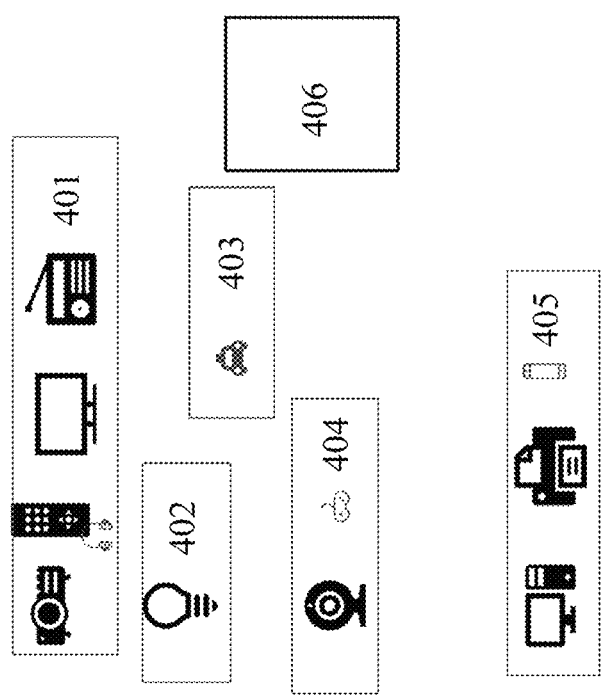
FIG. 4A is a drawing of an example vulnerability profile, produced by the present invention according to various embodiments of the present disclosure.

In FIG. 4A, an example vulnerability profile is shown. Such a vulnerability profile might be created by the system when an anomalous device is found to have joined a wireless network. For example, group 401 includes a projector, a remote control with headphones, a tv, and a radio player. These devices might lead to a vulnerability profile of display or audio devices that are constantly bringing in data from the internet and should mostly be sending harmless information back over the internet. Such harmless information might be the keystrokes on the remote control or radio player. This might be helpful in the case that more complex data is being sent back over these devices, that might indicate a problem because complex data should not be sent back over these devices, only simple data.

The light bulb 402 might have a vulnerability profile stating that it should be only sending data once in a long period of time, such as when the bulb needs to be replaced, or shortly before the bulb needs to be replaced. As such, if the bulb sends data more often than this, or sends a more complicated message than "the light bulb needs to be replaced", then the system might determine the bulb is malicious or is a rogue device.

A car 403 connected to the home's wireless network 406 might have a complicated vulnerability profile, because modern cars have at least 30 computers in them, and several messages might be sent regarding the status of various parts, or the need to have an oil change or some other message. As such, perhaps the vulnerability profile for a car might be that all the data should relate to the car or car parts, and any data sent that is not related to the car or car parts should be flagged and the car 403 might need to be investigated as a malicious or a rogue device. One possibility of how a car could be malicious or a rogue device might be if it is a self-driving car, in which case a malicious actor might take control of the car and drive it in a harmful manner.

Group 404 includes a webcam and a video game controller. Both of these devices send very complex data over the wireless network 406. As such, a vulnerability profile might be difficult here. Since both devices deal with visual display, perhaps any data that is not related to visual display might cause these devices to be flagged as malicious or a potential rogue device.

Group 405 includes a computer, a printer and a cell phone. These devices send incredibly complicated data over the wireless network 406. As such, a vulnerability profile will be a real challenge. In one embodiment of the invention, the system could utilize machine learning to learn how the user typically uses the computer, printer and cell phone. Then the system could determine if any actions are anomalous or unusual in any way, and at that point the device acting unusual could be flagged as malicious or a potential rogue device.

FIG. 4B displays a flowchart showing the process of creating a vulnerability profile for a group or device type, based on functions and other attributes of the device. Some examples of possible attributes are: entertainment, computing, door lock, garage door, thermostat, door bell, and lighting.

For example, a garage door might only send data on when the garage is opened or closed, and when it needs some kind of repair. So the vulnerability profile might indicate that any data that is not about opening or closing the garage door, or potential repairs to the garage door, might be flagged as anomalous, and the garage door device might be investigated as suspicious or a potential rogue device.

In another example, a thermostat might be analyzed through machine learning in order to determine a user's preferred temperature settings. As such, any deviation from these settings might be considered anomalous, and the thermostat might be investigated as suspicious or a potential rogue device. However, in this case since thermostat preferences might very well change based on guests or other human factors, perhaps an alert could be sent to the user, so that user can approve the change and no unnecessary investigation is performed.

Figure 5:
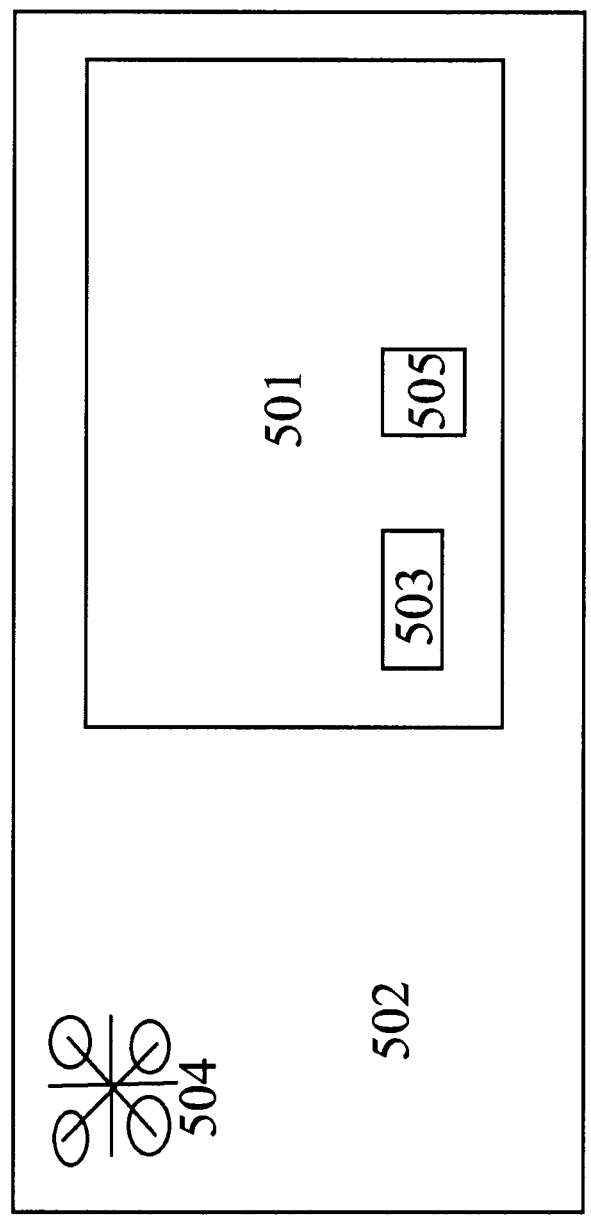
FIG. 5 is a drawing of an anomalous device interacting with a network, and detected by the present invention according to various embodiments of the present disclosure.

FIG. 5 is a drawing of an anomalous device interacting with a network, and detected by one embodiment of the present invention. A house 501 is shown, wherein there is a wireless network 502 used within the house 501. Then, the system 503 within the house 501 detects a drone 504. This drone 504 is outside the house, and therefore the system 503 concludes that the drone 504 is an anomalous device.

An additional confirmation by the system 503 that the drone 504 is an anomalous device, is that the drone 504 is not in the original registry 505 produced by the system 503.

The system 503 includes a setting that allows either immediate disconnection of an anomalous device, or informing a user of the system 503 that an anomalous device has joined, and asking the user what should be done about the situation. In the example of FIG. 5, a user has configured this setting such that immediate disconnection is allowed. Therefore, since the system 503 has found 2 reasons that the drone 504 is an anomalous device, and since the user has configured the setting to automatic disconnection of anomalous devices, the system 503 automatically disconnects the drone 504. The system also informs the user of the system 503 by email and text message of this disconnection.

Figure 6:
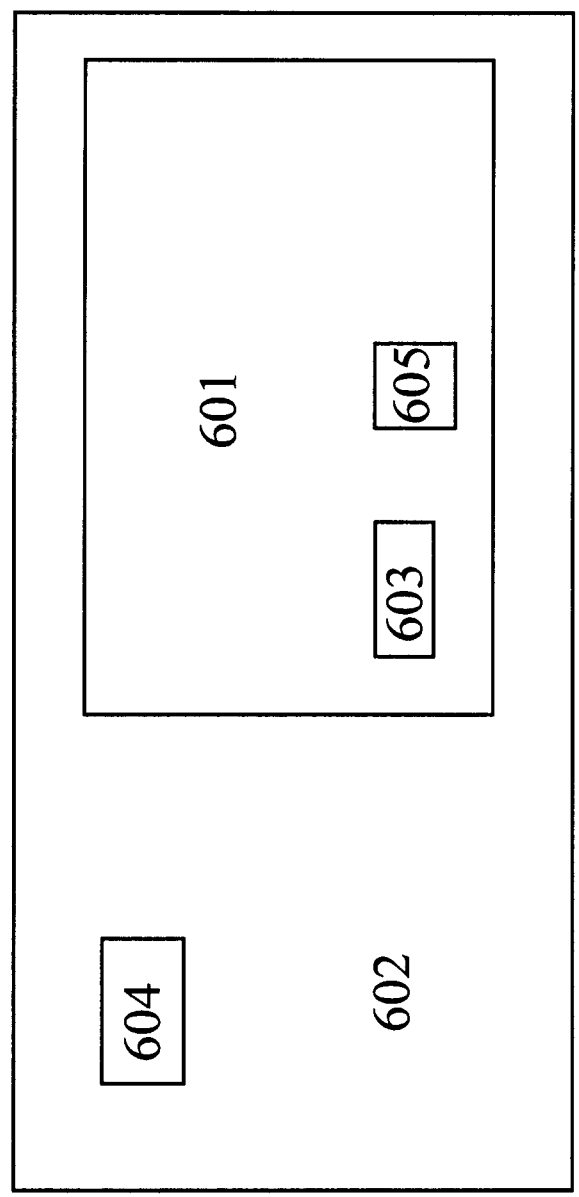
FIG. 6 is another drawing of an anomalous device interacting with a network, and detected by the present invention according to various embodiments of the present disclosure.

FIG. 6 is another drawing of an anomalous device interacting with a network, and detected by one embodiment of the present invention. A house 601 is shown, wherein there is a wireless network 602 used within the house 601. Then, the system 603 within the house 601 detects a computer 604. This computer 604 is outside the house, and therefore the system 603 concludes that the computer 604 is an anomalous device. The system 603 further pinpoints the location of the computer 604 as being in a neighbor's house, indicating that a neighbor has been stealing/using the wireless network 602 without the permission of the owner of the wireless network 602.

An additional confirmation by the system 603 that the computer 604 is an anomalous device, is that the computer 604 is not in the original registry 605 produced by the system 603.

The system 603 includes a setting that allows either immediate disconnection of an anomalous device, or informing a user of the system 603 that an anomalous device has joined, and asking the user what should be done about the situation. In the example of FIG. 6, a user has configured this setting such that the system 603 will only inform a user that an anomalous device has joined the network, and will not automatically remove anomalous devices.

As such, the system informs the user that an anomalous device has joined the network. The system also produces a vulnerability profile in order to assess the potential threat of the computer 604. This likely will include an analysis of potential malware on the computer 604, as well as other ways that the computer 604 could steal data and personal information from the wireless network 602 and from all the devices connected to the wireless network 602.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through the user's home security alarm system.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through the user's home security alarm system; wherein the monitoring device utilizes machine learning to learn how a user typically uses a computer, printer, cell phone and other internet of things devices; wherein the monitoring device utilizes machine learning in order to determine if any actions by any internet of things devices are anomalous or unusual in any way, by comparing actual actions to expected actions; wherein if the monitoring device determines that an internet of things device is acting unusual, then the internet of things device will be flagged as a malicious or a potential rogue device, and the monitoring device will send a notification to the user with the details of the malicious or potential rogue device.

In another embodiment, the invention is a system that provides cybersecurity comprising: several devices connected to a wireless network; a monitoring device that monitors all the devices connected to a wireless network;

wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through the user's home security alarm system; wherein the monitoring device calculates the physical location of any new device attempting to join the wireless network by measuring the direction of a signal connection between the monitoring device and each new device attempting to join the wireless network; wherein the monitoring device also measures the time of the signal connection between the monitoring device and each new device attempting to join the wireless network; wherein the monitoring device then calculates the distance and direction of each new device attempting to join the wireless network.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through user's home security alarm system; wherein the monitoring device calculates the physical location of any new device attempting to join the wireless network by measuring the direction of a signal connection between the monitoring device and each new device attempting to join the wireless network; wherein the monitoring device also measures the time of the signal connection between the monitoring device and each new device attempting to join the wireless network; wherein the monitoring device then calculates the distance and direction of each new device attempting to join the wireless network; wherein the monitoring device uses the physical location of a new device attempting to join the network in order to determine whether the new device is new or anomalous by analyzing whether the physical location is in a logical or normal physical location or not; wherein the monitoring device determines if a physical location is logical based on whether the physical location is within the same structure as the monitoring device or within the same floor as the monitoring device or within some other physically bounded area set by an administrator; wherein the monitoring device determines if a physical location is normal based on machine learning analysis of where devices already connected to the wireless network are usually utilized, and including these locations as normal locations; wherein if the monitoring device determines that the new device is not in a normal or logical location, then the monitoring device will consider the new device to be a malicious or rogue device, and the monitoring device will send a notification to the user with the details of the malicious or potential rogue device.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitor mu device can send alerts to a user through the user's home security alarm system; wherein the monitoring device calculates the physical location of any new device attempting to join the wireless network by measuring the direction of a signal connection between the monitoring device and each new device attempting to join the wireless network; wherein the monitoring device also measures the time of the signal connection between the monitoring device and each new device attempting to join the wireless network; wherein the monitoring device then calculates the distance and direction of each new device attempting to join the wireless network; wherein the monitoring device is aware of the user's location by tracking the user's cellular device, and so determines that any new device joining the wireless network while the user is more than 20 feet away from the house is considered a malicious or rogue device; wherein if the monitoring device detects a malicious or rogue device, then the monitoring device will send a notification to the user with the details of the malicious or potential rogue device.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through the user's home security alarm system; wherein the monitoring device calculates the physical location of any new device attempting to join the wireless network by measuring the direction of a signal connection between the monitoring device and each new device attempting to join the wireless network; wherein the monitoring device also measures the time of the signal connection between the monitoring device and each new device attempting to join the wireless network; wherein the monitoring device then calculates the distance and direction of each new device attempting to join the wireless network; wherein if the user's home security alarm system is set to away, then the monitoring device determines that any new device joining the wireless network is considered a malicious or rogue device; wherein the monitoring device will send a notification to the user with the details of the malicious or potential rogue device; and wherein the notification will be through the user's home security alarm system.

In another embodiment, the invention is a system that provides cybersecurity comprising: several devices connected to a wireless network; a monitoring device that monitors all the devices connected to a wireless network; wherein the monitoring device can remove a device from the wireless network; wherein the monitoring device detects any new devices attempting to join the wireless network; wherein the monitoring device determines whether a new device should be allowed to join the wireless network; wherein the monitoring device calculates the physical location of any new device attempting to join the wireless network; wherein the monitoring device can use the physical location of any new device in order to determine whether the new device is new or anomalous; wherein the monitoring device keeps a registry of an electronic signature from each of the devices the monitoring device has approved to be on the wireless network; wherein the monitoring device can use the registry in order to determine whether a device is new or anomalous; wherein the monitoring device can integrate into a user's home security alarm system; wherein the monitoring device can send alerts to a user through the user's home security alarm system; wherein the electronic signature of each device can be anything unique about each device, including: a unique pattern of data that is inflowing to each device; a unique pattern of data that is outflowing from each device; a unique type of communication from each device; a unique type of communication to each device; any communication with the device that is not through the wireless network, Bluetooth or a cellular network.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A system that provides cybersecurity comprising:
several devices connected to a wireless network;
a monitoring device that monitors all the devices connected to a wireless network;
wherein the monitoring device can remove a device from the wireless network;
wherein the monitoring device detects any new devices attempting to join the wireless network;
wherein the monitoring device determines whether a new device should be allowed to join the wireless network;
wherein the monitoring device calculates the physical location of any new device attempting to join the wireless network;
wherein the monitoring device can use the physical location of any new device in order to determine whether the new device is new or anomalous;
wherein the monitoring device keeps a registry of an electronic signature from each of the devices the monitoring device has approved to be on the wireless network;
wherein the monitoring device can use the registry in order to determine whether a device is new or anomalous;
wherein the monitoring device can integrate into a user's home security alarm system;
wherein the monitoring device can send alerts to a user through the user's home security alarm system;
wherein the monitoring device follows the following steps:
first, a user turning on a monitoring device that monitors all the devices connected to a wireless network;
second, the monitoring device joining a wireless network;
third, the monitoring device detecting all devices connected to the wireless network;
fourth, the system creating a registry of all devices connected to the wireless network;
fifth, the monitoring device analyzing the users connected to the network;
sixth, the monitoring device analyzing whether any devices should not be connected to the network;
seventh, the monitoring device analyzing whether any users should not be connected to the network;
eighth, the monitoring device determining the location of all the devices connected to the wireless network;
ninth, the monitoring device determining whether any of the locations of the devices connected to the wireless network are inappropriate, such as outside the house, or some other illogical location;
tenth, if the monitoring device determines a device has connected to the wireless network when that device is not supposed to be connected, then the monitoring device creates a vulnerability profile based on the potential threat from that device to the wireless network and the other devices on the wireless network;
eleventh, if necessary and capable, the monitoring device takes action to remove the anomalous device from the wireless network;
twelfth, the monitoring device might alert an administrator level human user about the anomalous device, either to inform the user that the anomalous device has been removed, or to ask the user to take some action to remove the anomalous device;
wherein the vulnerability profile includes information on the type of data that a device is supposed to send over the internet;
wherein the type of data that a device is supposed to send over the internet is based on the type of device, the normal use of the device, the intended use of the device, as well as a machine learning analysis of the typical use of the device;
wherein the monitoring device determines whether a device is actually sending data consistent with the type of data that the device is supposed to send over the internet;
wherein if the device is not sending data consistent with the type of data the device is supposed to send over the internet, then the monitoring device will consider the device a rogue or malicious device, and the monitoring device will send a notification to the user with the details of the malicious or potential rogue device.

2. A system that provides cybersecurity comprising:
several devices connected to a wireless network;

a monitoring device that monitors all the devices connected to a wireless network;
wherein the monitoring device can remove a device from the wireless network;
wherein the monitoring device detects any new devices attempting to join the wireless network;
wherein the monitoring device determines whether a new device should be allowed to join the wireless network;
wherein the monitoring device calculates the physical location of any new device attempting to join the wireless network;
wherein the monitoring device can use the physical location of any new device in order to determine whether the new device is new or anomalous;
wherein the monitoring device keeps a registry of an electronic signature from each of the devices the monitoring device has approved to be on the wireless network;
wherein the monitoring device can use the registry in order to determine whether a device is new or anomalous;
wherein the monitoring device can integrate into a user's home security alarm system;
wherein the monitoring device can send alerts to a user through the user's home security alarm system;
wherein the monitoring device calculates the physical location of any new device attempting to join the wireless network by measuring the direction of a signal connection between the monitoring device and each new device attempting to join the wireless network;
wherein the monitoring device also measures the time of the signal connection between the monitoring device and each new device attempting to join the wireless network;
wherein the monitoring device then calculates the distance and direction of each new device attempting to join the wireless network;
wherein the monitoring device uses the physical location of a new device attempting to join the network in order to determine whether the new device is new or anomalous by analyzing whether the physical location is in a logical or normal physical location or not;
wherein the monitoring device determines if a physical location is logical based on whether the physical location is within the same structure as the monitoring device or within the same floor as the monitoring device or within some other physically bounded area set by an administrator;
wherein the monitoring device determines if a physical location is normal based on machine learning analysis of where devices already connected to the wireless network are usually utilized, and including these locations as normal locations;
wherein if the monitoring device determines that the new device is not in a normal or logical location, then the monitoring device will consider the new device to be a malicious or rogue device, and the monitoring device will send a notification to the user with the details of the malicious or potential rogue device.

3. A system that provides cybersecurity comprising:
several devices connected to a wireless network;
a monitoring device that monitors all the devices connected to a wireless network;
wherein the monitoring device can remove a device from the wireless network;
wherein the monitoring device detects any new devices attempting to join the wireless network;
wherein the monitoring device determines whether a new device should be allowed to join the wireless network;
wherein the monitoring device calculates the physical location of any new device attempting to join the wireless network;
wherein the monitoring device can use the physical location of any new device in order to determine whether the new device is new or anomalous;
wherein the monitoring device keeps a registry of an electronic signature from each of the devices the monitoring device has approved to be on the wireless network;
wherein the monitoring device can use the registry in order to determine whether a device is new or anomalous;
wherein the monitoring device can integrate into a user's home security alarm system;
wherein the monitoring device can send alerts to a user through the user's home security alarm system;
wherein the monitoring device calculates the physical location of any new device attempting to join the wireless network by measuring the direction of a signal connection between the monitoring device and each new device attempting to join the wireless network;
wherein the monitoring device also measures the time of the signal connection between the monitoring device and each new device attempting to join the wireless network;
wherein the monitoring device then calculates the distance and direction of each new device attempting to join the wireless network;
wherein the monitoring device is aware of the user's location by tracking the user's cellular device, and so determines that any new device joining the wireless network while the user is more than 20 feet away from the house is considered a malicious or rogue device;
wherein if the monitoring device detects a malicious or rogue device, then the monitoring device will send a notification to the user with the details of the malicious or potential rogue device.

4. A system that provides cybersecurity comprising:
several devices connected to a wireless network;
a monitoring device that monitors all the devices connected to a wireless network;
wherein the monitoring device can remove a device from the wireless network;
wherein the monitoring device detects any new devices attempting to join the wireless network;
wherein the monitoring device determines whether a new device should be allowed to join the wireless network;
wherein the monitoring device calculates the physical location of any new device attempting to join the wireless network;
wherein the monitoring device can use the physical location of any new device in order to determine whether the new device is new or anomalous,
wherein the monitoring device keeps a registry of an electronic signature from each of the devices the monitoring device has approved to be on the wireless network;
wherein the monitoring device can use the registry in order to determine whether a device is new or anomalous;
wherein the monitoring device can integrate into a user's home security alarm system;
wherein the monitoring device can send alerts to a user through the user's home security alarm system;

wherein the monitoring device calculates the physical location of any new device attempting to join the wireless network by measuring the direction of a signal connection between the monitoring device and each new device attempting to join the wireless network;
wherein the monitoring device also measures the time of the signal connection between the monitoring device and each new device attempting to join the wireless network;
wherein the monitoring device then calculates the distance and direction of each new device attempting to join the wireless network;
wherein if the user's home security alarm system is set to away, then the monitoring device determines that any new device joining the wireless network is considered a malicious or rogue device;
wherein the monitoring device will send a notification to the user with the details of the malicious or potential rogue device;
and wherein the notification will be through the user's home security alarm system.

5. A system that provides cybersecurity comprising:
several devices connected to a wireless network;
a monitoring device that monitors all the devices connected to a wireless network;
wherein the monitoring device can remove a device from the wireless network;
wherein the monitoring device detects any new devices attempting to join the wireless network;
wherein the monitoring device determines whether a new device should be allowed to join the wireless network;
wherein the monitoring device calculates the physical location of any new device attempting to join the wireless network;
wherein the monitoring device can use the physical location of any new device in order to determine whether the new device is new or anomalous;
wherein the monitoring device keeps a registry of an electronic signature from each of the devices the monitoring device has approved to be on the wireless network;
wherein the monitoring device can use the registry in order to determine whether a device is new or anomalous;
wherein the monitoring device can integrate into a user's home security alarm system;
wherein the monitoring device can send alerts to a user through the user's home security alarm system;
wherein the monitoring device utilizes machine learning to learn how a user typically uses a computer, printer, cell phone and other internet of things devices;
wherein the monitoring device utilizes machine learning in order to determine if any actions by any internet of things devices are anomalous or unusual in any way, by comparing actual actions to expected actions;
wherein if the monitoring device determines that an internet of things device is acting unusual, then the internet of things device could be flagged as malicious or a potential rogue device;
wherein the monitoring device follows the following steps:
first, a user turning on a monitoring device that monitors all the devices connected to a wireless network;
second, the monitoring device joining a wireless network;
third, the monitoring device detecting all devices connected to the wireless network;
fourth, the system creating a registry of all devices connected to the wireless network;
fifth, the monitoring device analyzing the users connected to the network;
sixth, the monitoring device analyzing whether any devices should not be connected to the network;
seventh, the monitoring device analyzing whether any users should not be connected to the network;
eighth, the monitoring device determining the location of all the devices connected to the wireless network;
ninth, the monitoring device determining whether any of the locations of the devices connected to the wireless network are inappropriate, such as outside the house, or some other illogical location;
tenth, if the monitoring device determines a device has connected to the wireless network when that device is not supposed to be connected, then the monitoring device creates a vulnerability profile based on the potential threat from that device to the wireless network and the other devices on the wireless network;
eleventh, if necessary and capable, the monitoring device takes action to remove the anomalous device from the wireless network;
twelfth, the monitoring device might alert an administrator level human user about the anomalous device, either to inform the user that the anomalous device has been removed, or to ask the user to take some action to remove the anomalous device;
thirteenth, the monitoring device determining that only the correct devices are connected to the wireless network;
fourteenth, the monitoring device taking a snapshot of the location of the devices;
fifteenth, the monitoring device creating a registry of unique signatures of the devices connected to the network, so as to preserve the locations for use in the future in case a user wants to duplicate the setup of electronic devices in a new location;
wherein the vulnerability profile includes information on the type of data that a device is supposed to send over the internet;
wherein the type of data that a device is supposed to send over the internet is based on the type of device, the normal use of the device, the intended use of the device, as well as a machine learning analysis of the typical use of the device;
wherein the monitoring device determines whether a device is actually sending data consistent with the type of data that the device is supposed to send over the internet;
wherein if the device is not sending data consistent with the type of data the device is supposed to send over the internet, then the monitoring device will consider the device a rogue or malicious device;
wherein the monitoring device calculates the physical location of any new device attempting to join the wireless network by measuring the direction of a signal connection between the monitoring device and each new device attempting to join the wireless network;
wherein the monitoring device also measures the time of the signal connection between the monitoring device and each new device attempting to join the wireless network;
wherein the monitoring device then calculates the distance and direction of each new device attempting to join the wireless network;

wherein the monitoring device uses the physical location of a new device attempting to join the network in order to determine whether the new device is new or anomalous by analyzing whether the physical location is in a logical or normal physical location or not;

wherein the monitoring device determines if a physical location is logical based on whether the physical location is within the same structure as the monitoring device or within the same floor as the monitoring device or within some other physically bounded area set by an administrator;

wherein the monitoring device determines if a physical location is normal based on machine learning analysis of where devices already connected to the wireless network are usually utilized, and including these locations as normal locations;

wherein if the monitoring device determines that the new device is not in a normal or logical location, then the monitoring device will consider the new device to be a malicious or rogue device, and the monitoring device will send a notification to the user with the details of the malicious or potential rogue device.

6. A method that provides cybersecurity comprising:

several devices being connected to a wireless network;

first, a user turning on a monitoring device that monitors all the devices connected to a wireless network;

second, the monitoring device joining a wireless network;

third, the monitoring device detecting all devices connected to the wireless network;

fourth, the system creating a registry of all devices connected to the wireless network;

fifth, the monitoring device analyzing the users connected to the network;

sixth, the monitoring device analyzing whether any devices should not be connected to the network;

seventh, the monitoring device analyzing whether any users should not be connected to the network;

eighth, the monitoring device determining the location of all the devices connected to the wireless network;

ninth, the monitoring device determining whether any of the locations of the devices connected to the wireless network are inappropriate, such as outside the house, or some other illogical location;

tenth, if the monitoring device determines a device has connected to the wireless network when that device is not supposed to be connected, then the monitoring device creates a vulnerability profile based on the potential threat from that device to the wireless network and the other devices on the wireless network;

eleventh, if necessary and capable, the monitoring device takes action to remove the anomalous device from the wireless network; and twelfth, the monitoring device might alert an administrator level human user about the anomalous device, either to inform the user that the anomalous device has been removed, or to ask the user to take some action to remove the anomalous device;

wherein the vulnerability profile includes information on the type of data that a device is supposed to send over the internet;

wherein the type of data that a device is supposed to send over the internet is based on the type of device; the normal use of the device, the intended use of the device, as well as a machine learning analysis of the typical use of the device;

wherein the monitoring device determines whether a device is actually sending data consistent with the type of data that the device is supposed to send over the internet;

wherein if the device is not sending data consistent with the type of data the device is supposed to send over the internet, then the monitoring device will consider the device a rogue or malicious device, and the monitoring device will send a notification to the user with the details of the malicious or potential rogue device.

7. A method that provides cybersecurity comprising:

several devices being connected to a wireless network;

first, a user turning on a monitoring device that monitors all the devices connected to a wireless network;

second, the monitoring device joining a wireless network;

third, the monitoring device detecting all devices connected to the wireless network;

fourth, the system creating a registry of all devices connected to the wireless network;

fifth, the monitoring device analyzing the users connected to the network;

sixth, the monitoring device analyzing whether any devices should not be connected to the network;

seventh, the monitoring device analyzing whether any users should not be connected to the network;

eighth, the monitoring device determining the location of all the devices connected to the wireless network;

ninth, the monitoring device determining whether any of the locations of the devices connected to the wireless network are inappropriate, such as outside the house, or some other illogical location;

tenth, if the monitoring device determines a device has connected to the wireless network when that device is not supposed to be connected, then the monitoring device creates a vulnerability profile based on the potential threat from that device to the wireless network and the other devices on the wireless network;

eleventh, if necessary and capable, the monitoring device takes action to remove the anomalous device from the wireless network; and twelfth, the monitoring device might alert an administrator level human user about the anomalous device, either to inform the user that the anomalous device has been removed, or to ask the user to take some action to remove the anomalous device;

the monitoring device calculating the physical location of any new device attempting to join the wireless network by measuring the direction of a signal connection between the monitoring device and each new device attempting to join the wireless network;

the monitoring device also measuring the time of the signal connection between the monitoring device and each new device attempting to join the wireless network;

the monitoring device then calculating the distance and direction of each new device attempting to join the wireless network;

wherein the monitoring device uses the physical location of a new device attempting to join the network in order to determine whether the new device is new or anomalous by analyzing whether the physical location is in a logical or normal physical location or not;

wherein the monitoring device determines if a physical location is logical based on whether the physical location is within the same structure as the monitoring device or within the same floor as the monitoring device or within some other physically bounded area set by an administrator;

wherein the monitoring device determines if a physical location is normal based on machine learning analysis of where devices already connected to the wireless network are usually utilized, and including these locations as normal locations;

wherein if the monitoring device determines that the new device is not in a normal or logical location, then the monitoring device will consider the new device to be a malicious or rogue device, and the monitoring device will send a notification to the user with the details of the malicious or potential rogue device;

wherein the monitoring device is aware of the user's location by tracking the user's cellular device, and so determines that any new device joining the wireless network while the user is more than 20 feet away from the house is considered a malicious or rogue device;

wherein if the user's home security alarm system is set to away, then the monitoring device determines that any new device joining the wireless network is considered a malicious or rogue device; and wherein the electronic signature of each device can be anything unique about each device, including:

a unique pattern of data that is inflowing to each device;

a unique pattern of data that is outflowing from each device;

a unique type of communication from each device;

a unique type of communication to each device;

any communication with the device that is not through the wireless network, Bluetooth or a cellular network.

8. A method that provides cybersecurity comprising:

several devices being connected to a wireless network;

first, a user turning on a monitoring device that monitors all the devices connected to a wireless network;

second, the monitoring device joining a wireless network;

third, the monitoring device detecting all devices connected to the wireless network;

fourth, the system creating a registry of all devices connected to the wireless network;

fifth, the monitoring device analyzing the users connected to the network;

sixth, the monitoring device analyzing whether any devices should not be connected to the network;

seventh, the monitoring device analyzing whether any users should not be connected to the network;

eighth, the monitoring device determining the location of all the devices connected to the wireless network;

ninth, the monitoring device determining whether any of the locations of the devices connected to the wireless network are inappropriate, such as outside the house, or some other illogical location;

tenth, if the monitoring device determines a device has connected to the wireless network when that device is not supposed to be connected, then the monitoring device creates a vulnerability profile based on the potential threat from that device to the wireless network and the other devices on the wireless network;

eleventh, if necessary and capable, the monitoring device takes action to remove the anomalous device from the wireless network; and twelfth, the monitoring device might alert an administrator level human user about the anomalous device, either to inform the user that the anomalous device has been removed, or to ask the user to take some action to remove the anomalous device;

wherein the monitoring device utilizes machine learning to learn how a user typically uses a computer, printer, cell phone and other internet of things devices;

wherein the monitoring device utilizes machine learning in order to determine if any actions by any internet of things devices are anomalous or unusual in any way, by comparing actual actions to expected actions;

wherein if the monitoring device determines that an internet of things device is acting unusual, then the internet of things device could be flagged as malicious or a potential rogue device;

wherein the vulnerability profile includes information on the type of data that a device is supposed to send over the internet;

wherein the type of data that a device is supposed to send over the internet is based on the type of device, the normal use of the device, the intended use of the device, as well as a machine learning analysis of the typical use of the device;

wherein the monitoring device determines whether a device is actually sending data consistent with the type of data that the device is supposed to send over the internet;

wherein if the device is not sending data consistent with the type of data the device is supposed to send over the internet, then the monitoring device will consider the device a rogue or malicious device;

the monitoring device determining that only the correct devices are connected to the wireless network;

the monitoring device taking a snapshot of the location of the devices;

the monitoring device creating a registry of unique signatures of the devices connected to the network, so as to preserve the locations for use in the future in case a user wants to duplicate the setup of electronic devices in a new location;

the monitoring device calculating the physical location of any new device attempting to join the wireless network by measuring the direction of a signal connection between the monitoring device and each new device attempting to join the wireless network;

the monitoring device also measuring the time of the signal connection between the monitoring device and each new device attempting to join the wireless network;

the monitoring device then calculating the distance and direction of each new device attempting to join the wireless network;

wherein the monitoring device uses the physical location of a new device attempting to join the network in order to determine whether the new device is new or anomalous by analyzing whether the physical location is in a logical or normal physical location or not;

wherein the monitoring device determines if a physical location is logical based on whether the physical location is within the same structure as the monitoring device or within the same floor as the monitoring device or within some other physically bounded area set by an administrator;

wherein the monitoring device determines if a physical location is normal based on machine learning analysis of where devices already connected to the wireless network are usually utilized, and including these locations as normal locations;

wherein if the monitoring device determines that the new device is not in a normal or logical location, then the monitoring device will consider the new device to be a malicious or rogue device, and the monitoring device will send a notification to the user with the details of the malicious or potential rogue device.

9. A system that provides cybersecurity comprising:

several devices connected to a wireless network;

a monitoring device that monitors all the devices connected to a wireless network;

wherein the monitoring device can remove a device from the wireless network; wherein the monitoring device detects any new devices attempting to join the wireless network;

wherein the monitoring device determines whether a new device should be allowed to join the wireless network;

wherein the monitoring device calculates the physical location of any new device attempting to join the wireless network;

wherein the monitoring device can use the physical location of any new device in order to determine whether the new device is new or anomalous;

wherein the monitoring device keeps a registry of the electronic signature of all the devices the monitoring device has approved to be on the wireless network;

wherein the monitoring device can use the registry in order to determine whether a device is new or anomalous;

wherein the monitoring device utilizes machine learning to learn how a user typically uses a computer, printer, cell phone and other internet of things devices;

wherein the monitoring device utilizes machine learning in order to determine if any actions by any internet of things devices are anomalous or unusual in any way, by comparing actual actions to expected actions;

wherein if the monitoring device determines that an internet of things device is acting unusual, then the internet of things device could be flagged as malicious or a potential rogue device;

wherein the monitoring device follows the following steps:

first, a user turning on a monitoring device that monitors all the devices connected to a wireless network;

second, the monitoring device joining a wireless network;

third, the monitoring device detecting all devices connected to the wireless network;

fourth, the system creating a registry of all devices connected to the wireless network;

fifth, the monitoring device analyzing the users connected to the network;

sixth, the monitoring device analyzing whether any devices should not be connected to the network;

seventh, the monitoring device analyzing whether any users should not be connected to the network;

eighth, the monitoring device determining the location of all the devices connected to the wireless network;

ninth, the monitoring device determining whether any of the locations of the devices connected to the wireless network are inappropriate, such as outside the house, or some other illogical location;

tenth, if the monitoring device determines a device has connected to the wireless network when that device is not supposed to be connected, then the monitoring device creates a vulnerability profile based on the potential threat from that device to the wireless network and the other devices on the wireless network;

eleventh, if necessary and capable, the monitoring device takes action to remove the anomalous device from the wireless network;

twelfth, the monitoring device might alert an administrator level human user about the anomalous device, either to inform the user that the anomalous device has been removed, or to ask the user to take some action to remove the anomalous device;

thirteenth, the monitoring device determining that only the correct devices are connected to the wireless network;

fourteenth, the monitoring device taking a snapshot of the location of the devices;

fifteenth, the monitoring device creating a registry of unique signatures of the devices connected to the network, so as to preserve the locations for use in the future in case a user wants to duplicate the setup of electronic devices in a new location;

wherein the vulnerability profile includes information on the type of data that a device is supposed to send over the internet;

wherein the type of data that a device is supposed to send over the internet is based on the type of device, the normal use of the device, the intended use of the device, as well as a machine learning analysis of the typical use of the device;

wherein the monitoring device determines whether a device is actually sending data consistent with the type of data that the device is supposed to send over the internet;

wherein if the device is not sending data consistent with the type of data the device is supposed to send over the internet, then the monitoring device will consider the device a rogue or malicious device;

wherein the monitoring device calculates the physical location of any new device attempting to join the wireless network by measuring the direction of a signal connection between the monitoring device and each new device attempting to join the wireless network;

wherein the monitoring device also measures the time of the signal connection between the monitoring device and each new device attempting to join the wireless network;

wherein the monitoring device then calculates the distance and direction of each new device attempting to join the wireless network;

wherein the monitoring device uses the physical location of a new device attempting to join the network in order to determine whether the new device is new or anomalous by analyzing whether the physical location is in a logical or normal physical location or not;

wherein the monitoring device determines if a physical location is logical based on whether the physical location is within the same structure as the monitoring device or within the same floor as the monitoring device or within some other physically bounded area set by an administrator;

wherein the monitoring device determines if a physical location is normal based on machine learning analysis of where devices already connected to the wireless network are usually utilized, and including these locations as normal locations;

wherein if the monitoring device determines that the new device is not in a normal or logical location, then the monitoring device will consider the new device to be a malicious or rogue device, and the monitoring device will send a notification to the user with the details of the malicious or potential rogue device.

* * * * *